Figure 1:
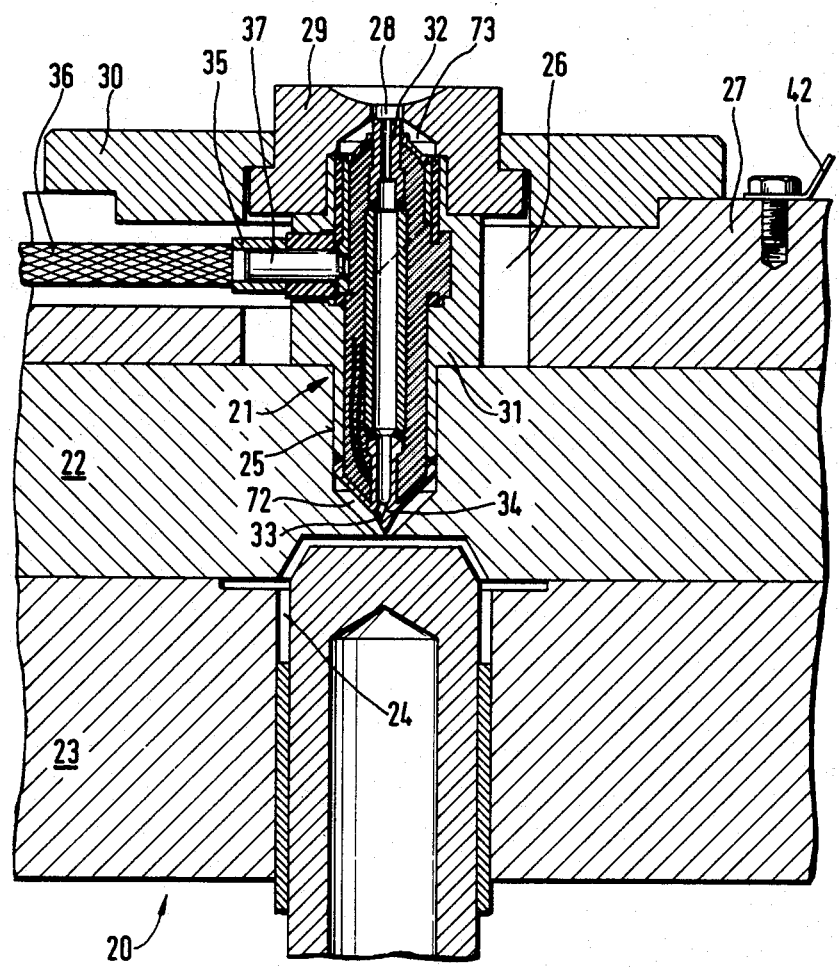

United States Patent [19]

Davidsmeyer

[11] Patent Number: 4,514,160
[45] Date of Patent: Apr. 30, 1985

[54] INJECTION NOZZLE WITH DIRECT ELECTRIC HEATING

[76] Inventor: Walter F. Davidsmeyer, Glatzer Weg 15, 3004 Isernhagen 2, Fed. Rep. of Germany

[21] Appl. No.: 569,906

[22] Filed: Jan. 11, 1984

[30] Foreign Application Priority Data

Jan. 17, 1983 [DE] Fed. Rep. of Germany ....... 3301272

[51] Int. Cl.³ .............................. B29F 1/03; B29F 1/08
[52] U.S. Cl. ................................ 425/143; 264/328.15; 425/549
[58] Field of Search ............... 264/328.15; 425/378 R, 425/378 S, 143, 549

[56] References Cited

U.S. PATENT DOCUMENTS

| | | | |
|---|---|---|---|
| 2,338,691 | 1/1944 | Tucker | 425/143 |
| 2,551,439 | 5/1951 | Kovacs | 425/143 |
| 3,797,984 | 3/1974 | Yago et al. | 425/543 |
| 4,290,744 | 9/1981 | Daniels et al. | 425/549 |
| 4,340,156 | 7/1982 | Müller | 425/549 |
| 4,344,750 | 8/1982 | Gellert | 425/549 |
| 4,370,115 | 1/1983 | Miura | 425/549 |
| 4,422,841 | 12/1983 | Alfonsi et al. | 425/549 |

FOREIGN PATENT DOCUMENTS 2342009  2/1976  France .

*Primary Examiner*—Willard E. Hoag
*Attorney, Agent, or Firm*—Burns, Doane, Swecker & Mathis

[57] ABSTRACT

In the construction of hot channel nozzles (21) very precise temperature control over the length of a nozzle channel is desirable. To achieve this, a nozzle tube (32) for accommodating the plastic melt is constructed as an electrical resistance heater over its entire length, i.e. up to the nozzle bore (33), and can accordingly be heated. The nozzle tube (32) has differing, namely adapted, heating power over its length as a result of appropriate construction over its length, so that a substantially uniform temperature of the plastic melt is achieved.

21 Claims, 13 Drawing Figures

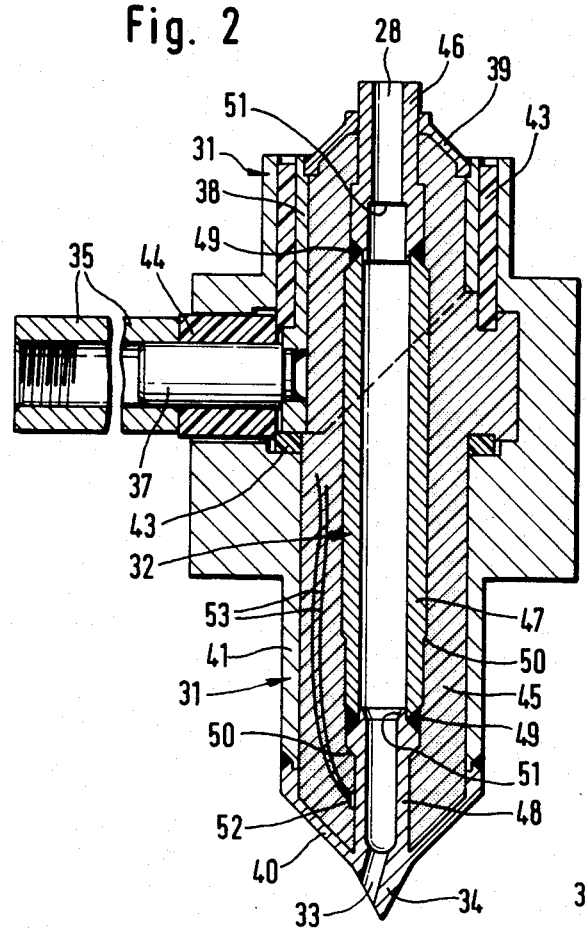
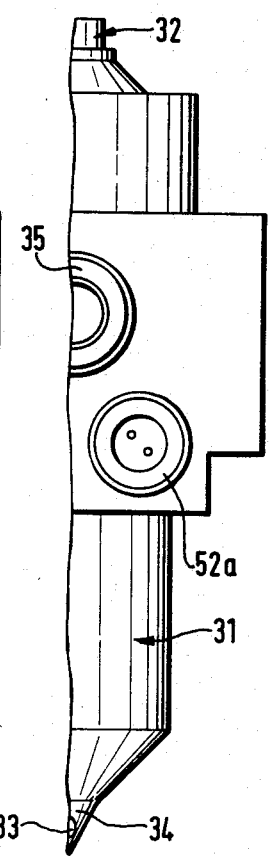
Fig. 2
Fig. 3
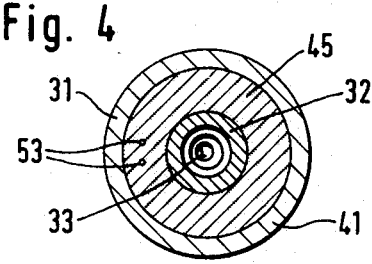
Fig. 4

INJECTION NOZZLE WITH DIRECT ELECTRIC HEATING

DESCRIPTION

The invention relates to a device for feeding flowable materials (thermoplastics) from an injection molding unit to a mold (cavity), with at least one hot channel nozzle which possesses a nozzle channel for the flow of the material up to a nozzle bore, it being possible to heat the material in the nozzle channel by means of an electrical heat conductor (electrical resistance heater).

For processing heat-sensitive materials (thermoplastics) by injection molding, the temperature control after the material has left the injection unit and up to the mold, namely when it enters a mold cavity, is particularly important. In order to keep the flowable material in this zone at an approximately constant and uniform temperature, hot channel systems equipped with hot channel nozzles matching the mold are employed. In these, the material is kept at the desired temperature by heating.

In a known hot channel nozzle, a heating device in the form of an electrical rod heater is arranged centrally in the nozzle channel. The material flows round the heating rod or heat conductor. The outer boundary of the nozzle channel forms a cylindrical jacket which is also heated as an electrical conductor.

The annular flow channel for the material, resulting from the location of the heating rod in the cross-section of the channel, is unfavorable. Above all, however, it is a disadvantage that in the outer zone the cylindrical wall of the nozzle channel results in a different (lower) temperature than in the zone of the heating rod. Consequently, a temperature gradient exists within the channel cross-section and this is a disadvantage in view of the technological properties of the material.

It is an object of the present invention to propose a hot channel system or hot channel nozzle which has a simple construction with little proneness to faults, permits extremely precise definition of the temperature over the entire region, ie. over the full length of the nozzle channel, and at the same time exhibits a uniform temperature within the channel cross-section.

To achieve this object, the hot channel nozzle according to the invention is wherein the nozzle channel is constructed as a tube (nozzle tube) of electrically conductive material and acts as an electrical resistance heater up to the nozzle bore (gate).

In the invention, a constant and uniform temperature in the material is achieved in the cross-section by constructing the nozzle channel as a tubular electrical resistance heater. However, what is particularly important is to create uniform temperature conditions over the entire length of the hot channel nozzle or nozzle channel up to its outermost end facing the mold cavity, namely up to the gate. The entire length of the nozzle tube forms part of the electrical heating and is thereby appropriately heated.

According to a further proposal of the invention, the nozzle tube forming the nozzle channel is so constructed and of such dimensions that in each cross-sectional zone the electrical resistance corresponds to the local requirements, so that at a defined, predetermined and adjustable voltage a particular heating power, namely that required for the particular zone, is achieved, especially to ensure a subatantially uniform temperature of the plastic melt over the entire length of the nozzle tube. According to the invention, the above properties are achieved by the choice of dimensions of the nozzle tube (external and/or internal diameter of the nozzle tube) and/or by the electrotechnical properties of the material. The nozzle tube is preferably divided into several portions of different geometrical and material-technical features. Preferably, the electrical resistance in a portion of the tube which faces the nozzle bore (gate) is higher than in a middle portion of the tube.

According to a further proposal of the invention the (electrically conductive) nozzle tube is embedded in an insulating jacket over substantially its entire length. This jacket consists of a material having high heat insulating capacity and high compressive strength. The insulating jacket thereby on the one hand produces highly effective heat insulation of the nozzle tube and on the other hand provides mechanical support of the nozzle tube against the pressure stresses within the nozzle tube. Preferably, the insulating jacket consists of a ceramic composition.

The invention also provides a manifold system of special construction, in which a plurality of hot channel nozzles are connected to runners consisting of runner tubes which are made of an electrically conductive material and are, like the nozzle tube, constructed as resistance heaters. A plurality of hot channel nozzles are connected to one runner tube, namely via special connectors. These connectors are provided with caps which cover the inlet orifice of the nozzle tube and are spaced away from the hot channel nozzle, this spacing away from the nozzle tube or hot channel nozzle forming an prechamber filled with plastic. The connector is preferably provided with a tube guide which is connected to the cap and permits the passage of a transverse tube (runner tube).

A connector in the present sense is preferably also employed in converse arrangement in the zone of the connection of a connecting nozzle for the feed of the material to the runner system.

In the invention, connection points or crossing points of tubes (runner tubes) in the runner system are also of special construction. In a simple tube crossing point, a cross-shaped piece is used. If a connecting nozzle for feeding material into the runner system has to be connected up in the zone of a tube crossing point, a cross-shaped connecting piece again specially constructed according to the invention is employed.

The tube connections according to the invention are of simple and effective construction and cope with the thermal expansions which the (runner) tubes undergo.

Further features of the invention relate to the construction of the hot channel nozzle and of the runner system.

Figure 5:
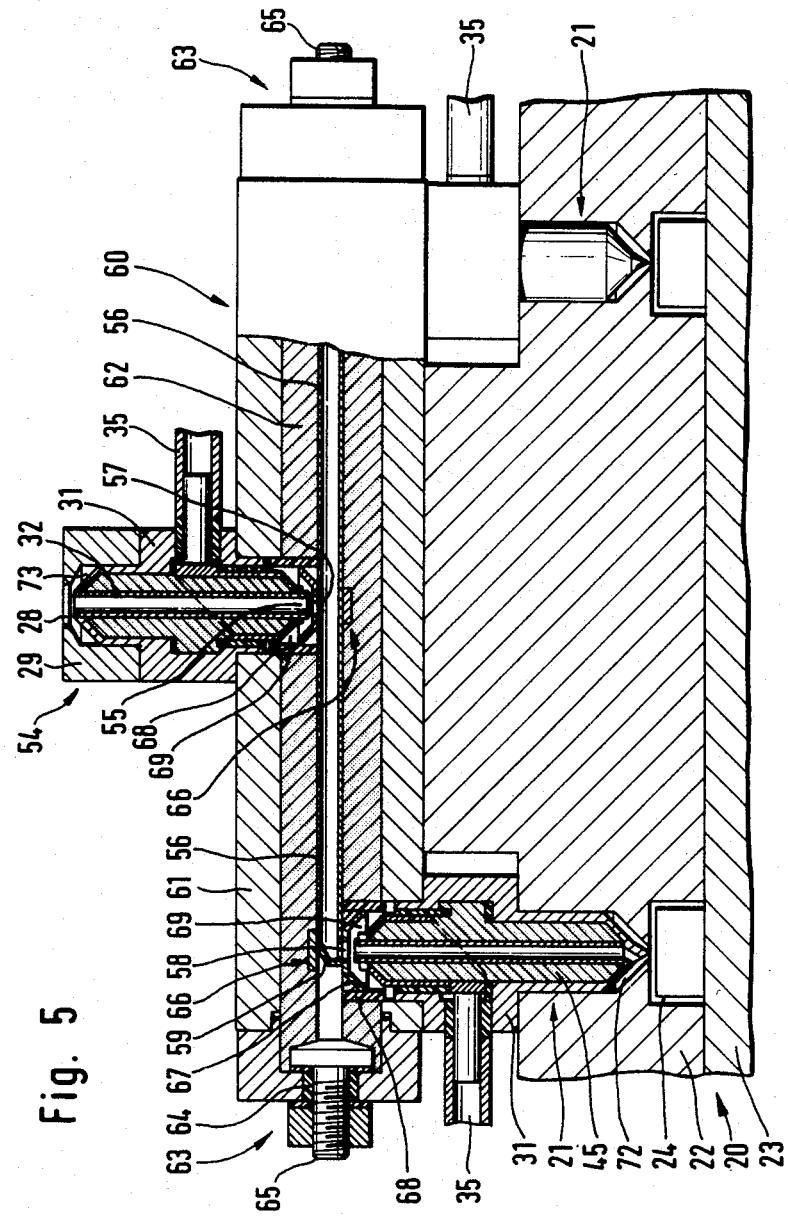
Figure 6:
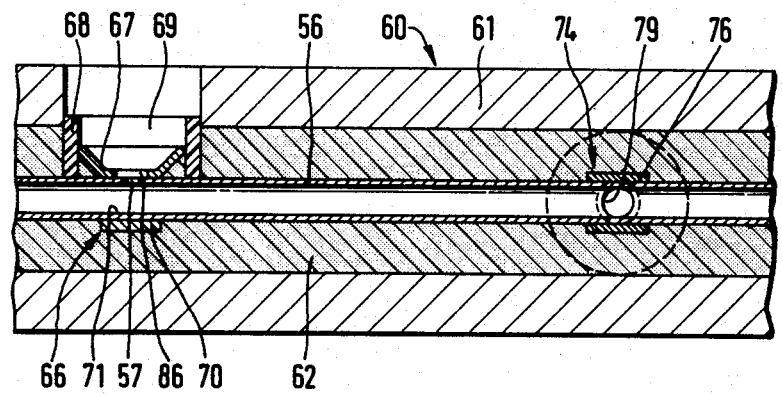
Figure 7:
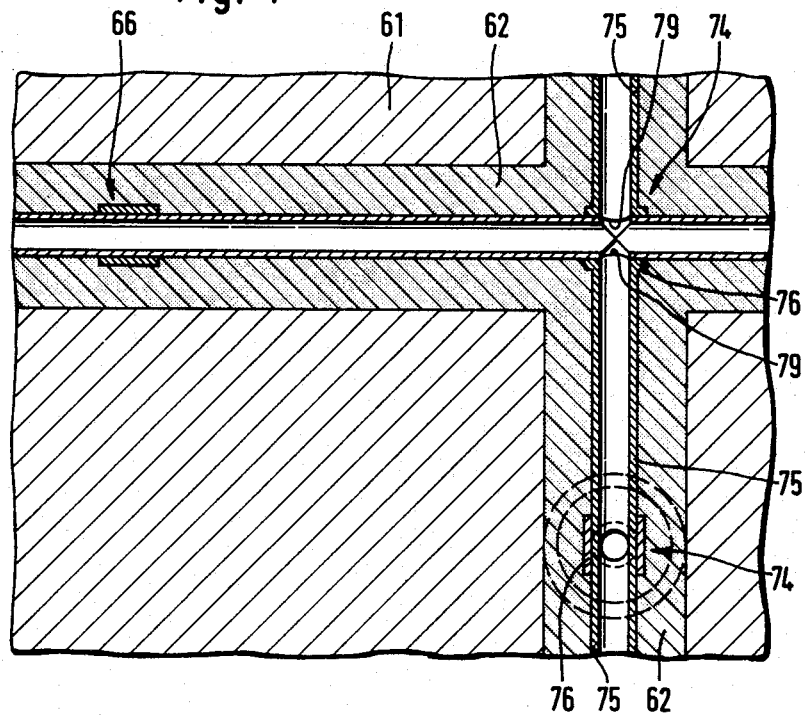
Figure 8:
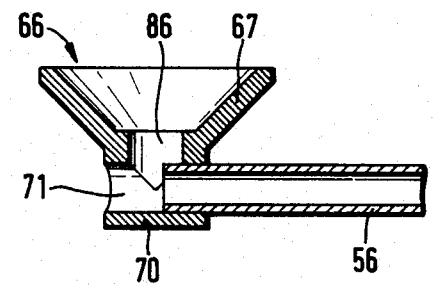
Figure 9:
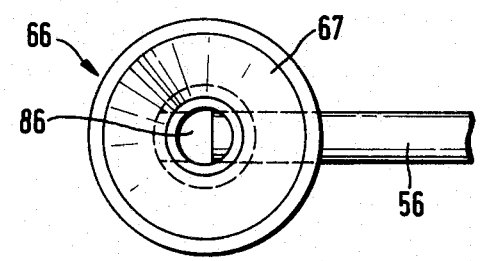
Figure 10:
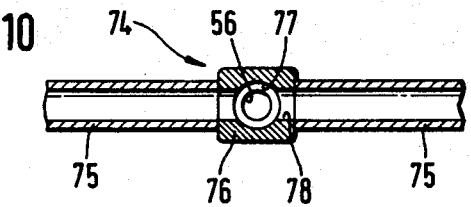
Figure 11:
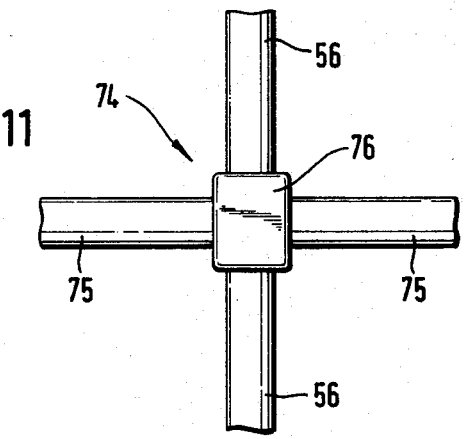
Figure 12:
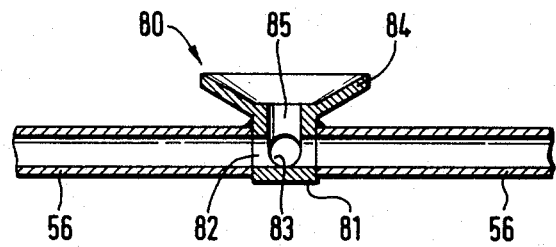
Figure 13:
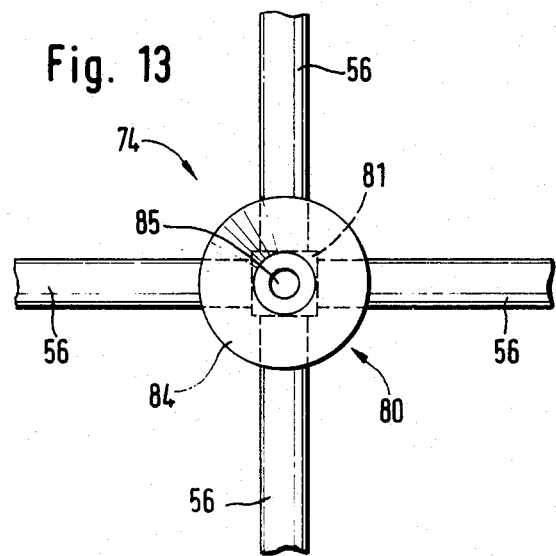

Illustrative embodiments of the hot channel nozzle and of the runner system are explained in more detail below, with reference to the drawings, in which:

FIG. 1 shows a hot channel nozzle in longitudinal section, with the corresponding constructional components of a mold, FIG. 2 shows the hot channel nozzle in longitudinal section, on an enlarged scale, FIG. 3 shows the detail of FIG. 2 as a (half) side view, FIG. 4 shows a cross-section through the hot channel nozzle according to FIG. 2, in the lower zone, FIG. 5 shows a runner system with hot channel nozzles and a connecting nozzle, partially in vertical section, FIG. 6 shows a portion of a runner block in longitudinal section, FIG. 7 shows a (horizonal) section through a runner block with intersecting runner tubes, FIG. 8 shows, in section, a detail, namely a connector for connecting tubes and nozzles, FIG. 9 shows a plan view of the detail of FIG. 8, FIG. 10 shows a longitudinal section in the zone of a tube crossing point (runner tube crossing point), FIG. 11 shows a plan view of the detail according to FIG. 10, FIG. 12 shows a section through a tube crossing point with means of connection of a nozzle (connection nozzle), and FIG. 13 shows a plan view of the detail of FIG. 12.

FIG. 1 shows parts of a possible or preferred overall construction of a mold 20 with hot channel nozzle 21. The mold here consists of two mold platens 22 and 23 which define a mold cavity 24 for receiving the plasticized or flowable plastic. The hot channel nozzle 21 is located in the zone of the (upper) mold platen 22 and a part of the nozzle seats in a recess 25 of this platen 22. Outside this platen, the hot channel nozzle 21 is located in an orifice 26 of a mold-mounting platen 27. The orifice 26 has a larger internal diameter than the external dimensions of the hot channel nozzle 21. A receiving member 29 is placed over the hot channel nozzle 21 in the zone of an inlet orifice 28 of the latter. Here, a connection is made to an orifice of an injection unit. The receiving member 29 is connected to the mold-mounting platen 27 via a centering flange 30.

The hot channel nozzle (FIG. 2) consists of an outer, preferably cylindrical housing 31 made of an electrically conductive material (metal). Within the housing 31 there runs, in the longitudinal direction, a nozzle channel in the form of a nozzle tube 32. The flowable material is introduced into this tube via the inlet orifice 28 and travels to a (lower) nozzle bore 33 which faces the mold cavity 24. The material issues via 33 and enters the mold cavity 24. In the illustrative embodiment shown, the nozzle bore 33 is staggered laterally relative to the longitudinal central axis of the nozzle tube 32 and is located at an acute angle to the said axis. The nozzle bore 33 is located within a conical tube end 34 which terminates in a point. The outer point of this tube end 34 terminates directly at the boundary of the mold cavity 24.

The nozzle tube 32 is constructed as an electrical resistance heater over its entire length. For this reason, the nozzle tube consists of electrically conductive material of high electrical resistance. By supply of electric current, the nozzle tube 32 is heated up to the tip of the tube end 34, ie. over its entire length, so that the material within the nozzle tube 32 is heated correspondingly. The current used for this has a low voltage, of about 3 to 12 V, and an intensity of about 100 A.

In the present illustrative embodiment the current enters and leaves via the housing 31. A transversely projecting connecting stub 35 is provided laterally on the housing 31. A current line 36 leads to this stub. The connecting stub 35 is connected via an electrically conductive connecting pin 37 to a part of the housing 31 which faces the side of the inlet orifice 28, namely connected to a sleeve 38. By this sleeve, the current is led via an end cover 39—conical in the present case—of the housing 31 to the end of the nozzle tube 32 which faces the inlet orifice 28.

Electrically conductive connections to the lower part of the housing 31 are provided on the end of the nozzle tube 32 which faces the mold cavity 24, these connections being an end wall 40—again conical—of the housing, which end wall forms an integral piece with, on the one hand, the nozzle tube 32 and, on the other hand, an adjacent cylinder portion 41 of the housing 31. The end wall 40 connects to the cylindrical zone of the nozzle tube 32 in the zone of the transition from this cylindrical zone to the tube end 34.

The current then flows via the housing 31, the receiving member 29 and the centering flange 30 into the mold-mounting platen 27, to which is connected an earth lead 42.

The sleeve 38 is inserted as a separate part into the housing 31 and is delimited from its outer wall by a ring-shaped or sleeve-shaped insulation 43. The connecting stub 35 is also delimited from the electrically conductive part of the housing 31 by an insulation ring 44 in the zone of the connecting pin 37.

Within the housing 31 thus constructed, the nozzle tube 32 is surrounded by an insulating jacket 45. This serves, on the one hand, to prevent external loss of heat. On the other hand, the insulating jacket 45 supports the nozzle tube 32 on the housing 31 against internal pressures. The insulating jacket 45 is therefore made of pressure-resistant material, especially of a ceramic composition having a heat-insulating action.

The nozzle tube 32 is so constructed that different electrical resistances and hence different heating powers are achieved over the length of the tube. In the present illustrative embodiment the nozzle tube consists of a plurality of tube portions 46, 47 and 48. These are electrically conductively connected to one another by welds 49.

The first tube portion 46, facing the inlet orifice 28, has a relatively small internal diameter and also a relatively small external diameter. The electrical resistance in the zone of this tube portion is therefore relatively high. It is followed by the tube portion 47 located in the middle zone of the insulating jacket 45. Here, a relatively large external diameter and also a larger internal diameter are chosen, so that a relatively smaller electrical resistance results. The tube portion 48 which faces the nozzle bore 33 has a very high electrical resistance due to the thin-walled construction of the tube portion 48 and due to a stepwise-reduced internal diameter. Here, a higher heating power is needed because heat is removed via the end walls 40 and the tube end 34.

The electrical resistance and hence the heating power are additionally influenced through choice of different materials of construction. The tube portions 46, 47 and 48 preferably consist of a nickel-based alloy. However, the composition of the material is preferably different in the zone of the tube portion 48, on the one hand, and the zone of the tube portions 46 and 47, on the other hand, so that a lower electrical conductivity and hence a higher resistance results in the zone of the tube portion 48.

As may further be seen from FIG. 2, shoulders 50 and 51 are formed on the outside and inside of the nozzle tube 32 and these locally also affect the resistance, and hence the heating power, as a result of producing a change in the cross-sectional area of the nozzle tube 32. As a result, the temperature in the plastic melt can be defined relatively accurately over the entire length of the nozzle tube 32. In the present case the precise temperature is above all monitored in the zone of the tube portion 48 by a thermocouple 52 which is mounted on the wall of the tube portion 48 and is connected via leads 53 to a bush 54 in the housing 31 to permit connection to a current control device. The latter varies the current (ie. the current intensity) in accordance with the measurements recorded by the thermocouple.

Hot channel nozzles 21 of the above-described type or other types are employed in conjunction with a runner system which usually consists of a shared connecting nozzle 54, one or more runners and one or more hot channel nozzles.

In the illustrative embodiment of FIG. 5, there is provided a connecting nozzle 54 whose construction substantially corresponds to that of the hot channel nozzle 21, but with relatively inverted arrangement. Hence, identical or corresponding components are marked with the same numerals. The injection molding unit is applied to this connecting nozzle 54 or the receiving member 29.

The flowable material is fed via a (lower) exit orifice 55 to a transverse runner which in the present case is constructed as a transverse runner tube 56. This possesses, in the tube wall in the zone of the exit orifice 55, an inlet hole 57 for receiving the material.

In the runner tube 56, the material travels in both directions, ie. to the two hot channel nozzles 21 allocated to the runner tube 56 and located, at a distance from the connecting nozzle 54 and on the opposite side from the said nozzle. In the zone of the hot channel nozzles, namely adjacent to the inlet orifice 28, an exit hole 58 is formed in the wall of the runner tube 56. The material passes via this hole into the nozzle tube 32. In the zone of the exit hole 58, a tube closure 59 is provided in the runner tube 56 and this closure, by virtue of its shape (angled construction) assists the flow of the material to the exit hole 58.

The runner tube 56 is located in a runner block 60. This consists of an outer runner housing 61 of electrically conductive material. Within the latter, the approximately centrically located runner tube is embedded in an insulating jacket 62 corresponding to the insulating jacket 45 of the hot channel nozzle.

In the present case, the runner tube 56 is also constructed as an electrical resistance heater. As a result the material is heated by the runner tube 56 over the entire length of the flow path. For this purpose, the runner tube 56 is mounted at its ends in or on the runner housing by means of end members 63, in particular with electrical insulation 64 from the runner housing 61. The end members 63 also include current connections 65. Moreover devices for compensating for thermal expansion, in particular cup springs (not shown), are provided in the zone of the end members 63. The runner tube 56 can moreover be constructed analogously to the nozzle tube 32 in respect of the electrical resistance.

Connectors, or connections between the runner tube 56 and the nozzles (hot runner nozzle 21 and connecting nozzle 54) are of special construction.

For this purpose, connecting members 66 are used. An essential part of these is a cap 67 which—in the case of the connection of hot channel nozzles 21—is located spaced away from the inlet orifice 28 of the nozzle tube 32 (above the latter). Consequently there results, in a zone surrounded by a (cylindrical) insulating piece 68, a prechamber of angled cross-section, this prechamber accordingly being bounded by the housing 31 (end cover 39) on the one hand and the cap 67, on the other hand, as well as being bounded laterally by the insulating piece 68. Plastic accumulates in the prechamber 69 and solidifies there, so that a completely sealed transition results, which permits relative movements resulting from thermal expansion. On the side which faces the runner tube 56 the cap 67 is (partially) covered by material of the insulating jacket 62. A passage orifice 86 is provided in the cap 67, which orifice corresponds to the inlet hole 57 or the exit hole 58.

In the present case, a tube guide 70 is integrally connected to the cap 67. This tube guide has a transverse tube passage 71, so that the runner tube 56 can be pushed through the tube guide 70. The runner tube 56 is thereby connected to the connecting member 66. At the same time, longitudinal relative movements due to thermal expansion can take place.

In the zone of the connecting nozzle 54, namely at the (lower) end, facing the runner tube 56, a connecting member 66 (with relatively inverted arrangement) is again provided.

A free space 72 or 73 is also formed in the zone of the exit (nozzle bore 33) of the hot channel nozzle 21 and of the inlet (inlet orifice 28) of the connecting nozzle 54, in particular by appropriate dimensioning of the recess 25 and receiving member 29 respectively. These free spaces 72 and 73 also become filled with plastic, which hardens and thereby forms a movable seal.

Crossing points of tubes (runner tubes) are also of special construction.

FIG. 6 shows a tube crossing-point 74 between a runner tube 56 and a transverse connecting tube 75, in two staggered sections. In the case shown, the runner tube 56 is the main tube, mounted in a crossing member 76 (FIGS. 10 and 11). This crossing member is a special shaped piece with crossing passages, namely a tube passage 77 for slidably accommodating the runner tube 56 and a through-bore 78 of internal diameter corresponding to the internal diameter of the connecting tube 75. The latter extends, in the form of separate tube portions, up to the crossing member 76 and is connected to the latter in particular by welding. The above tube crossing 74 allows relative movements due to thermal expansion. Within the crossing member 76, the runner tube 56 is provided with lateral bores 79 which produce the connection to the transverse connecting tube 75.

FIGS. 12 and 13 show details of a tube crossing in which material is also introduced or removed in the zone of the tube crossing. In particular, a connecting nozzle 54 can be attached in the zone of the crossing (above the latter). For this purpose, a special connecting crossing member 80 is used, which combines elements of the connectors 66 and of the crossing member 76. A tube member 81 is provided with mutually crossing bores 82 and 83 having the internal diameter of the adjoining tubes (runner tubes). The (four) runner tubes 56 connect, in the zone of the bores 82 and 83, to four different sides of the tube member 81 and are connected to the latter by welding.

A connecting member for the connecting nozzle 54 is attached to the tube member 81 (or below the latter), this connecting member being a cap 84 analogous to the cap 67, and having a channel 85 leading to the intersection point of the bores 82 and 83. Material can be passed via the shared feed (connecting nozzle) into four runner tubes 56 through which material is led away.

Where details of the hot channel nozzle 21 or of the runner system have not been described individually, known prior art embodiments are employed.

I claim:

1. A device for feeding flowable materials from an injection molding unit to a mold with at least one hot channel nozzle which possesses a nozzle channel, for the flow of the material up to a nozzle bore, an electrical heat conductor, wherein the nozzle channel is constructed as a tube of electrically conductive material and acts as an electrical resistance heater up to the nozzle bore the tube construction being such that resistance per unit length differs for different portions of said tube so that an essentially uniform temperature of the flowable material is insured up to the nozzle outlet bore.

2. A device according to claim 1, wherein a temperature probe (thermocouple 52) is allocated to the tube (32), especially adjacent to the nozzle bore (33), which probe is located within an insulating jacket (45) and is connected to a current-regulating device.

3. A device according to claim 1, wherein a prechamber (69) or a free space (72,73) is formed between the ends of the hot channel nozzle (21) or a connector nozzle (54)—end cover (39) or end wall (40)—on the one hand and adjoining parts of the device (receiving member 29, mold-mounting platen 22), which chamber or free space accommodates (hardening) plastic which serves as a seal.

4. A device according to claim 1, wherein an electrical supply lead to the tube (32) is formed at the inlet end (inlet orifice 28) thereof and an electrical outlet lead is formed immediately in the zone of a tube end (34) processing the nozzle bore (33).

5. A device according to claim 4, wherein the tube end (34) tapers conically to a point and has a laterally off-set nozzle outlet bore (33) and that the electrical outlet line is connected up in the zone of the transition from the tube end (34) to the (cylindrical) tube (32).

6. A device according to claim 1, wherein the tube (32) material has a non-uniform cross-sectional area over the length of said tube.

7. A device according to claim 6 wherein the tube (32) is so constructed that the internal or external diameter varies so as to provide different resistance in different portions of the tube.

8. A device according to claim 1, wherein the tube (32) is embedded over virtually its entire length in an insulating jacket (45) which consists of a highly heat-insulating and pressure-resistant material and fills an interspace between the tube (32) and a (outer) housing (31).

9. A device according to claim 8, wherein the insulating jacket (45) is covered, in the zone of the inlet orifice (28) or of the nozzle bore (33) by a preferably conical end cover (39) or a correspondingly shaped end wall (40), which at the same time serve as current-conducting members between the nozzle tube (32) and the housing (31) or an electrically conductive sleeve (38) located in the housing (31).

10. A device according to claim 1, wherein the tube (32) consists of a plurality of tube portions (46,47,48) which possess differing electrical properties (resistance).

11. A device according to claim 10, wherein the tube portions (46,47,48) consist of materials which differ, in particular with respect to electrical conductivity.

12. A device according to claim 10, wherein a tube portion (48) which faces the nozzle bore (33) is constructed of a material of high electrical resistance or of small electrically effective cross-sectional area or has a small internal diameter.

13. A device according to claim 10, wherein a middle tube portion (47) is constructed with a large internal or external diameter and consists of a material of relatively low electrical resistance.

14. A device according to claim 1, wherein a plurality of hot channel nozzles (21) are connected to a shared runner tube (56) or to a plurality of runner tubes which are overall constructed as an electrical resistance heater and are supplied with current via electrical connections.

15. A device according to claim 14, wherein at least one transverse connecting nozzle (54) is allocated to each runner tube (56), the said connecting nozzle being constructed analogously to the hot channel nozzle (21) and having a nozzle tube 32 constructed as an electrical resistance heater.

16. A device according to claim 14, wherein the runner tubes (56) are located in a runner block (60) and are mounted in an insulating jacket (62) of a runner housing (61).

17. A device according to claim 14, wherein in order to form a tube crossing point (runner tube 56 with connecting tube 75) a crossing member (76) having a tube passage (77) and a through-bore (78) is provided, one tube (runner tube 56) being passed through the tube passage (77) of the crossing member (76) whilst the other (divided) tube (connecting tube (75)) adjoins with its ends the crossing member (76) in the zone of the through-bore (78).

18. A device according to claim 14, wherein connecting members (66) are provided in the zone of the connection of a hot channel nozzle (21) or of a connecting nozzle (54) to a runner tube (56), which connecting members have a cap (67), facing the hot channel nozzle (21) or the connecting nozzle (54) which because of its similar shape and being spaced away from the facing part of the hot channel nozzle (21) or the connecting nozzle (74), defines, with the latter, a prechamber (69).

19. A device according to claim 18, wherein the cap (67) is provided with a tube guide (70) for accommodating a runner tube (56) in the zone of a tube passage (71).

20. An apparatus according to claim 14, wherein in the zone of a tube crossing point with material inlet or outlet a connecting crossing member (80) is provided, which consists of a tube member (81) with mutually crossing through-bores (82 and 83), the ends of a plurality of (four) tubes (runner tubes 56) being connected to the tube member (81) in the zone of the bores (82,83).

21. A device according to claim 20, wherein a cap (84) with a channel (85) leading to the crossing of the bores (82,83) is provided on the tube member (81), the cap (84) serving for connection to a connecting nozzle (54).

* * * * *